(12) United States Patent
Wang

(10) Patent No.: US 11,894,942 B2
(45) Date of Patent: Feb. 6, 2024

(54) COMMUNICATION SYSTEM BASED ON DOCSIS PROTOCOL

(71) Applicant: Nanning FuLian FuGui Precision Industrial Co., Ltd., Nanning (CN)

(72) Inventor: Zhi-Qiang Wang, Shenzhen (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

(21) Appl. No.: 17/837,274

(22) Filed: Jun. 10, 2022

(65) Prior Publication Data

US 2023/0353409 A1  Nov. 2, 2023

(30) Foreign Application Priority Data

Apr. 27, 2022 (CN) .......................... 202210453242.0

(51) Int. Cl.
| | |
|---|---|
| H04N 7/173 | (2011.01) |
| H04L 12/28 | (2006.01) |
| H04N 21/61 | (2011.01) |
| H04L 5/14 | (2006.01) |
| H04N 21/6338 | (2011.01) |
| H04N 21/2383 | (2011.01) |

(52) U.S. Cl.
CPC .......... *H04L 12/2801* (2013.01); *H04L 5/143* (2013.01); *H04N 21/2383* (2013.01); *H04N 21/6118* (2013.01); *H04N 21/6168* (2013.01); *H04N 21/6338* (2013.01)

(58) Field of Classification Search
CPC ............... H04N 21/2383; H04N 21/63; H04N 21/6118; H04N 21/6168; H04N 21/6338
See application file for complete search history.

(56) References Cited

U.S. PATENT DOCUMENTS

| | | | |
|---|---|---|---|
| 10,749,551 B1* | 8/2020 | Finkelstein | H04B 1/405 |
| 11,133,915 B2 | 9/2021 | Kol et al. | |
| 2017/0134067 A1* | 5/2017 | Le-Ngoc | H04L 5/1461 |
| 2017/0244445 A1* | 8/2017 | Jin | H04B 3/232 |
| 2020/0304278 A1 | 9/2020 | Hung et al. | |
| 2023/0155804 A1* | 5/2023 | Maricevic | H04L 5/1423 370/276 |

FOREIGN PATENT DOCUMENTS

GB  2314999 A  *  1/1998  ............... H04B 1/56

* cited by examiner

*Primary Examiner* — Gigi L Dubasky
(74) *Attorney, Agent, or Firm* — ScienBiziP, P.C.

(57) ABSTRACT

A communication system based on DOCSIS protocol includes a server, configured to send a signal and demodulate a received signal; a coaxial cable, configured to transmit signals through a coaxial cable network; a frequency divider, configured to divide the signal sent by the server into a downstream signal and a full duplex signal; a downstream communication path, configured to transmit the downstream signal to a first modulation and demodulation unit; an upstream communication path, configured to transmit a upstream signal sent by a second modulation and demodulation unit to the server; a full duplex communication path, configured to simultaneously transmit the downstream signal divided by the frequency divider and the upstream signal, separate the downstream signal from the full duplex signal and transmit to the first modulation and demodulation unit, and transmit the upstream signal sent by the second modulation and demodulation unit to the server.

9 Claims, 5 Drawing Sheets

COMMUNICATION SYSTEM BASED ON DOCSIS PROTOCOL

CROSS-REFERENCE TO RELATED APPLICATIONS

This application claims priority to Chinese Patent Application No. 202210453242.0 filed on Apr. 27, 2022, in China National Intellectual Property Administration, the contents of which are incorporated by reference herein.

FIELD

The present disclosure relates to a field of signal transmission, in particular to a communication system based on DOCSIS protocol.

BACKGROUND

In the cable network market, with the continuous growth of users' demand for upstream/downstream network speed, DOCSIS 3.1/3.0/2.0 can no longer meet the needs of users. DOCSIS 4.0 came into being, to provide users with higher upstream/downstream rate, the upstream bandwidth is expanded from 204 MHz to 684 MHz in DOCSIS 4.0. However, such expansion of bandwidth still cannot meet the current needs of users for network speed.

DETAILED DESCRIPTION

Figure 1:
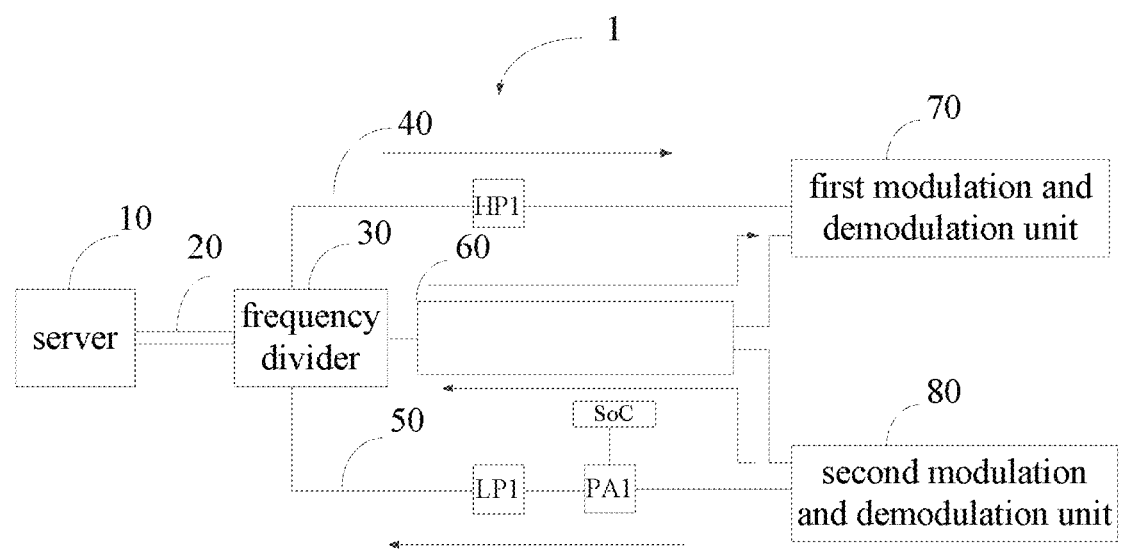
FIG. 1 is a module diagram of an embodiment of the communication system 1 based on DOCSIS protocol according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a module diagram of an embodiment of the communication system 1 based on DOCSIS protocol of the present invention. In this embodiment, the communication system 1 based on DOCSIS protocol is applicable to DOCSIS 3.1/3.0/2.0 and DOCSIS 4.0, including a server 10, a coaxial cable 20, a frequency divider 30, a downstream communication path 40, a upstream communication path 50, a full duplex communication path 60, a first modulation and demodulation unit 70 and a second modulation and demodulation unit 80.

Specifically, the server 10 is configured to send signals and demodulate received signals. The server 10 may be, but is not limited to, a CMTS (cable modem termination system) device. The coaxial cable 20 transmits the signals sent and received by the server 10 through a coaxial cable network. In the embodiment, the coaxial cable 20 can be a hybrid fiber coax (HFC). The frequency divider 30 is connected to the coaxial cable 20 for dividing the signal sent by the server 10 into a downstream signal and a full duplex signal. At the same time, the transmission path is divided into three transmission paths with different frequency points by the frequency divider 30: the downstream communication path 40, the upstream communication path 50 and the full duplex communication path 60 to transmit signals at different frequency points. The downstream communication path 40 is configured to transmit the downstream signal sent by the server 10 to the first modulation and demodulation unit 70. The upstream communication path 50 is configured to transmit the upstream signal sent by the second modulation and demodulation unit 80 to the server 10. The full duplex communication path 60 is configured to simultaneously transmit the downstream signal divided by the frequency divider 30 and the upstream signal sent by the second modulation and demodulation unit 80, separate the downstream signal from the full duplex signal and transmit to the first modulation and demodulation unit 70, and further transmit the upstream signal sent by the second modulation and demodulation unit 80 to the server 10.

In the embodiment, a bandwidth range of the downstream communication path 40 is 684 MHz~1812 MHz, and the downstream communication path 40 includes: a first high pass filter HP1, electrically connected between the frequency divider 30 and the first modulation and demodulation unit 70 to pass a high-frequency downstream signal with the bandwidth of 684 MHz~1812 MHz, so as to ensure that the downstream signal sent from the CMTS has no attenuation in the bandwidth of 684 MHz~1812 MHz, reduce parasitic interference outside the band and reduce the signal-to-noise ratio in a signal transmission. A bandwidth range of the upstream communication path 50 is 5 MHz~85

MHz, and the upstream communication path 50 includes a first power amplifier PA1, electrically connected to the second modulation and demodulation unit 80 for adjusting a power of the upstream signal sent by the second modulation and demodulation unit 80; a system-on-a-chip SoC, electrically connected to the first power amplifier for controlling a magnification of the first power amplifier PA1; a first low-pass filter LP1, electrically connected between the first power amplifier PA1 and the frequency divider 30 for passing the low-frequency upstream signal with the bandwidth of 5 MHz~85 MHz, so as to ensure that the upstream signal sent by the second modulation and demodulation unit 80 has no attenuation in the bandwidth of 5 MHz~85 MHz, reduce the parasitic interference outside the band and reduce the signal-to-noise ratio of signal transmission.

Figure 2:
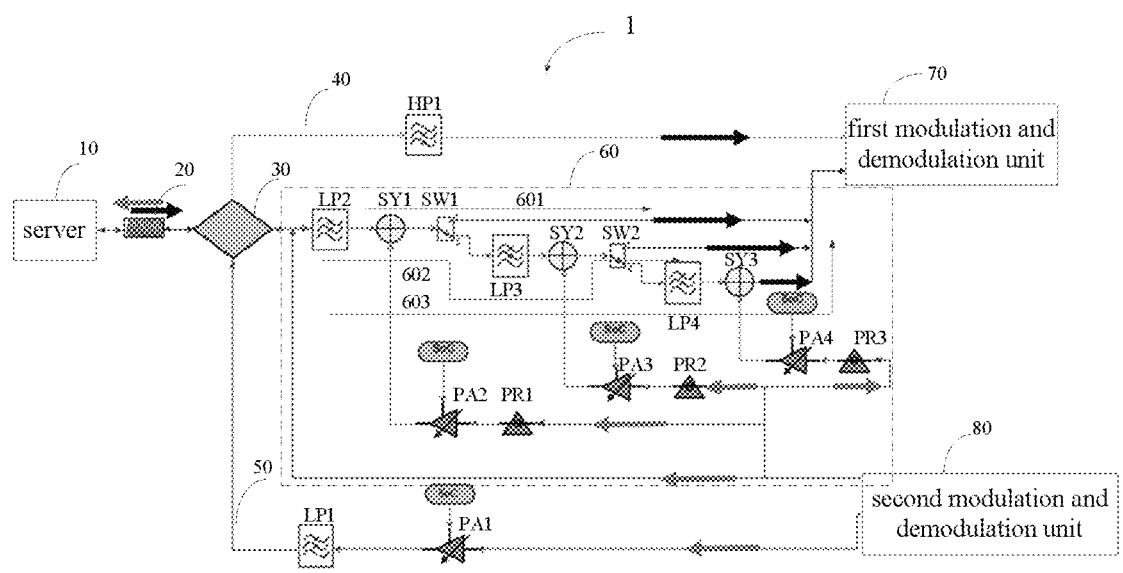
FIG. 2 is a module diagram of another embodiment of the communication system 1 based on DOCSIS protocol according to the present disclosure.

As shown in FIG. 2, FIG. 2 is a module diagram of another embodiment of the communication system 1 based on DOCSIS protocol of the present disclosure. In the embodiment, the communication system 1 based on DOCSIS protocol is applicable to DOCSIS3.1/3.0/2.0 and DOCSIS4.0, including a server 10, a coaxial cable 20, a frequency divider 30, a downstream communication path 40, a upstream communication path 50, a full duplex communication path 60, a first modulation and demodulation unit 70 and a second modulation and demodulation unit 80. The working principle of the server 10, the coaxial cable 20, the frequency divider 30, the downstream communication path 40, the upstream communication path 50, the first modulation and demodulation unit 70 and the second modulation and demodulation unit 80 is similar to the above embodiment, will not be repeated here.

In the embodiment, the full duplex communication path 60 performs signal separation on the full-duplex signal, and separates the downstream signal therefrom. In-band stepped (three-stage filter path) filter design reduces the harmonic interference of each frequency band is used, which is to ensure signal integrity and reliability. Specifically, as shown in FIG. 2, the full duplex communication path 60 includes a primary filter path 601, a secondary filter path 602, a tertiary filter path 603 and an upstream sub communication path 604. A bandwidth range of full duplex communication path 60 is 108 MHz~684 MHz. The second modulation and demodulation unit 80 is electrically connected to the frequency divider 30 to form the upstream sub communication path 604 to transmit the upstream signal sent by the second modulation and demodulation unit 80 to the server 10.

In the embodiment, the primary filtering path 601 includes: a second low-pass filter LP2, electrically connected to the frequency divider 30 or passing downstream signals with the bandwidth of 108 MHz~684 MHz; a first synthesizer SY1, a first input end of the first synthesizer SY1 is electrically connected to an output of the second low-pass filter LP2 for removing the upstream signal in the full duplex signal leading to the first modulation and demodulation unit 70; a first RF switch SW1, a common end of the first RF switch SW1 is electrically connected to an output end of the first synthesizer SY1, and a first end of the first RF switch SW1 is electrically connected to the first modulation and demodulation unit 70 for transmitting the downstream signal with the bandwidth of 108 MHz~684 MHz to the first modulation and demodulation unit 70; a first phase regulator PR1, an input end of the first phase regulator PR1 is electrically connected to the second modulation and demodulation unit 80 for phase adjustment of the upstream signal sent by the second modulation and demodulation unit 80; a second power amplifier PA2, an input end of the second power amplifier PA2 is electrically connected to an output end of the first phase regulator PR1, and an output end of the second power amplifier is electrically connected to a second input end of the first synthesizer SY1 for adjusting a power of the phase adjusted signal and outputting a signal with the opposite phase and the same power as the upstream signal sent by the second modulation and demodulation unit 80; the system-on-a-chip SoC, electrically connected to the second power amplifier PA2 for controlling a magnification of the second power amplifier PA2.

Figure 3:
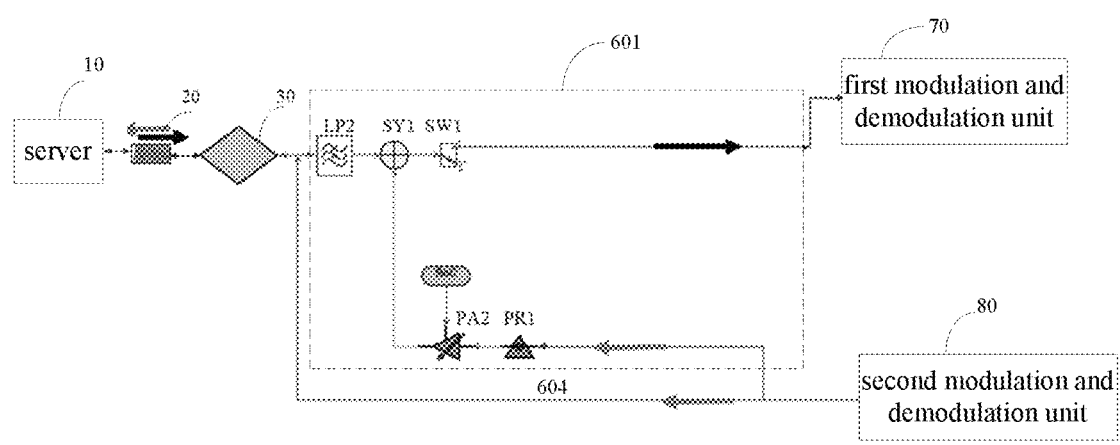
FIG. 3 is a schematic diagram of a signal flow direction of the primary filter path and the upstream sub communication path according to and embodiment of the present disclosure.

Combined with FIG. 3, FIG. 3 is a schematic diagram of a signal flow direction of the primary filter path 601 and the upstream sub communication path 604. As shown in FIG. 3, the full duplex signal divided by the frequency divider 30 is transmitted to the first modulation and demodulation unit 70 through the second low-pass filter LP2, the first synthesizer SY1 and the first end of the first RF switch SW1. The upstream signal sent by the second modulation and demodulation unit 80 is divided into two channels. One channel is transmitted to the server 10 through the upstream sub communication path 604, and the other channel enters the first modulation and demodulation unit 70 through the first synthesizer SY1 and the first end of the first RF switch SW1 after being adjusted by the first phase regulator PR1 and the second power amplifier PA2.

In the embodiment, the secondary filtering path includes: the second low-pass filter LP2, the input end of the second low-pass filter LP2 is electrically connected to the frequency divider 30 for passing the downstream signal with a bandwidth of 108 MHz~684 MHz; the first synthesizer SY1, the first input of the first synthesizer SY1 is electrically connected to the output of the second low-pass filter LP2; the first RF switch SW1, the common end of the first RF switch SW1 is electrically connected to the output end of the first synthesizer SY1; a third low-pass filter LP3, an input end of the third low-pass filter LP3 is electrically connected to a second end of the first RF switch SW1 for passing the downstream signal with a bandwidth of 108 MHz~492 MHz; a second synthesizer SY2, a first input end of the second synthesizer SY2 is electrically connected to an output of the third low-pass filter LP3; a second RF switch SW2, a common end of the second RF switch SW2 is electrically connected to an output end of the second synthesizer SY2, and a first end of the second RF switch SW2 is electrically connected to the first modulation and demodulation unit for transmitting the downstream signal with the bandwidth of 108 MHz~492 MHz to the first modulation and demodulation unit 70; a second phase regulator PR2, an input end of the second phase regulator PR2 is electrically connected to the second modulation and demodulation unit 80 for phase adjustment of the upstream signal sent by the second modulation and demodulation unit 80; a third power amplifier PA3, an input end of the third power amplifier PA3 is electrically connected to an output end of the second phase regulator PR2, and an output end of the third power amplifier is electrically connected to a second input end of the second synthesizer SY2, for adjusting a power of the phase adjusted signal and output a signal with the opposite phase and the same power as the upstream signal sent by the second modulation and demodulation unit 80; the system-on-a-chip SoC, electrically connected to the third power amplifier PA3, for controlling a magnification of the third power amplifier PA3.

Figure 4:
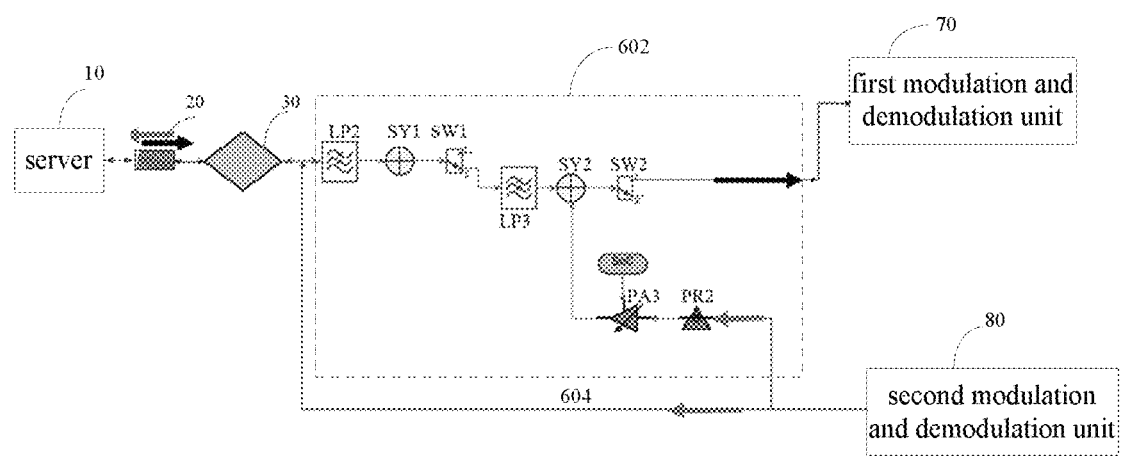
FIG. 4 is a schematic diagram of a signal flow direction of the secondary filter path and the upstream sub communication path according to and embodiment of the present disclosure.

Combined with FIG. 4, FIG. 4 is a schematic diagram of a signal flow direction of the secondary filter path 602 and the upstream sub communication path 604. As shown in FIG. 4, the full duplex signal divided by the frequency divider 30 is transmitted to the first modulation and demodulation unit 70 through the second low-pass filter LP2, the first synthesizer SY1, the second end of the first RF switch SW1, the third low-pass filter LP3, the second synthesizer SY2 and the first end of the second RF switch SW2. At this time, there is no signal input to the second input end of the first synthesizer SY1, and the signals at the first input end and the output end of the first synthesizer SY1 are consistent without any signal processing. The upstream signal sent by the second modulation and demodulation unit 80 is divided into two channels. One channel is transmitted to the server 10 through the upstream sub communication path 604, and the other channel enters the first modulation and demodulation unit 70 through the first end of the second synthesizer SY2 and the second RF switch SW1 after being adjusted by the second phase regulator PR2 and the third power amplifier PA3.

In the embodiment, the tertiary filter path includes: the second low-pass filter LP2, the input end of the second low-pass filter LP2 is electrically connected to the frequency divider 30 or passing the downstream signal with a bandwidth of 108 MHz~684 MHz; the first synthesizer SY1, the first input of the first synthesizer SY1 is electrically connected to the output end of the second low-pass filter LP2; the first RF switch SW1, the common end of the first RF switch SW1 is electrically connected to the output end of the first synthesizer SY1; the third low-pass filter LP3, the input end of the third low-pass filter LP3 is electrically connected to the second end of the first RF switch SW1 for passing the downstream signal with a bandwidth of 108 MHz~492 MHz; the second synthesizer SY2, the first input end of the second synthesizer SY2 is electrically connected to the output end of the third low-pass filter LP3; the second RF switch SW2, the common end of the second RF switch SW2 is electrically connected to the output end of the second synthesizer SY2; a fourth low-pass filter LP4, an input end of the fourth low-pass filter LP4 is electrically connected to a second end of the second RF switch SW2; a third synthesizer SY3, a first input end of the third synthesizer SY3 is electrically connected to an output end of the fourth low-pass filter LP4, and an output of the third synthesizer SY3 is electrically connected to the first modulation and demodulation unit 70 for transmitting the downstream signal with the bandwidth of 108 MHz~300 MHz to the first modulation and demodulation unit 70; a third phase regulator PR3, an input end of the third phase regulator PR3 is electrically connected to the second modulation and demodulation unit 80 for phase adjustment of the upstream signal sent by the second modulation and demodulation unit 80; a fourth power amplifier PA4, an input end of the fourth power amplifier PA4 is electrically connected to an output end of the third phase regulator PR3, and the output end of the fourth power amplifier PA4 is electrically connected to the second input end of the third synthesizer SY3, for adjusting a power of the phase adjusted signal and output a signal with the opposite phase and the same power as the upstream signal sent by the second modulation and demodulation unit 80; the system-on-a-chip SoC, electrically connected to the fourth power amplifier PA4, for controlling a magnification of the fourth power amplifier PA4.

Figure 5:
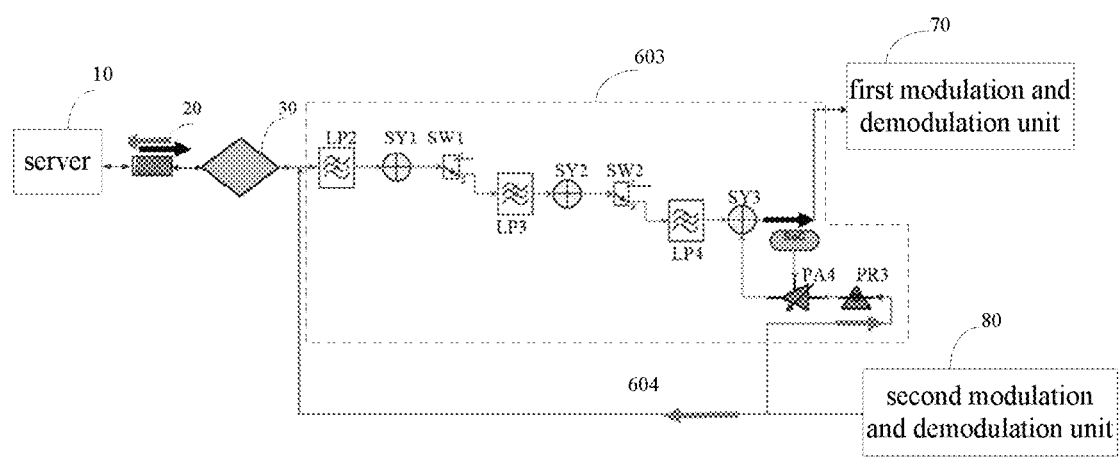
FIG. 5 is a schematic diagram of a signal flow direction of the tertiary filter path and the upstream sub communication path according to and embodiment of the present disclosure.

Combined with FIG. 5, FIG. 5 is a schematic diagram of a signal flow direction of the tertiary filter path 603 and the upstream sub communication path 604. As shown in FIG. 5, the full duplex signal divided by the frequency divider 30 passes through the second low-pass filter LP2, the first synthesizer SY1, the second end of the first RF switch SW1, the third low-pass filter LP3, the second synthesizer SY2, the second end of the second RF switch SW2, the fourth low-pass filter LP4 and the third synthesizer SY3 to transmit to the first modulation and demodulation unit 70. At this time, there is no signal input to the second input of the second synthesizer SY2, and the signals at the first input end and the output end of the second synthesizer SY2 are consistent without any signal processing. The upstream signal sent by the second modulation and demodulation unit 80 is divided into two channels. One channel is transmitted to the server 10 through the upstream sub communication path 604, and the other channel enters the first modulation and demodulation unit 70 through the third synthesizer sy3 after being adjusted by the third phase regulator PR3 and the fourth power amplifier PA4. The upstream and downstream are multiplexed within the bandwidth of 108 MHz~684 MHz to improve the upstream and downstream transmission speed.

The communication system 1 based on DOCSIS protocol provided by the invention is applicable to DOCSIS3.1/3.0/2.0 and DOCSIS4.0. When the communication protocol is DOCSIS3.1/3.0/2.0, the common end of the first RF switch SW1 is connected to the first end, and the second power amplifier PA2, the third power amplifier PA3 and the fourth power amplifier PA4 have no signal output. When the communication protocol is DOCSIS4.0: when the bandwidth range of the downstream signal is a first bandwidth range: 108 MHz~300 MHz, the common end of the first RF switch SW1 is connected to the second end, and the common end of the second RF switch SW2 is connected to the second end; when the bandwidth range of the downstream signal is a second bandwidth range: 300 MHz~492 MHz, the common end of the first RF switch SW1 is connected to the second end, and the common end of the second RF switch SW2 is connected to the first end; when the bandwidth range of the downstream signal is a third bandwidth range of 492 MHz~684 MHz, the common end of the first RF switch SW1 is connected to the first end.

In a process of signal transmission, the transmission path will cause signal loss, so it is necessary to compensate the damaged signal. Specifically, the second modulation and demodulation unit 80 is further configured to send out calibration signals with the first bandwidth range, the second bandwidth range and the third bandwidth range. When the second modulation and demodulation unit 80 sends out the calibration signal with the first bandwidth range, the calibration signal reaches the first modulation and demodulation unit 70 through the upstream sub communication path 604 and the tertiary filter path 603, and the system-on-a-chip SoC adjusts the fourth power amplifier PA4 and the third phase regulator PR3 to cause the power of the calibration signal with the first bandwidth range obtained by the first modulation and demodulation unit 70 to become 0 dbmv. The system-on-a-chip SoC is further configured to record relevant parameters of the fourth power amplifier PA4 and the third phase regulator PR3 at this time.

When the second modulation and demodulation unit 80 sends out the calibration signal with the second bandwidth range, the calibration signal reaches the first modulation and demodulation unit 70 through the upstream sub communication path 604 and the secondary filter path 603, and the system-on-a-chip SoC adjusts the third power amplifier PA3 and the second phase regulator PR2 to cause the power obtained by the calibration signal of the second bandwidth range in the first modulation and demodulation unit 70 to become 0 dbmv. The system-on-a-chip SoC is further configured to record relevant parameters of the third power amplifier PA3 and the second phase regulator PR2 at this time.

When the second modulation and demodulation unit 80 sends out the calibration signal with the third bandwidth range, the calibration signal reaches the first modulation and demodulation unit 70 through the upstream sub communication path 604 and the primary filter path 603, and the system-on-a-chip SoC adjusts the second power amplifier PA2 and the first phase regulator PR1 to cause the power obtained by the calibration signal of the third bandwidth range in the first modulation and demodulation unit 70 to become 0 dbmv. The system-on-a-chip SoC is further configured to record relevant parameters of the second power amplifier PA2 and the first phase regulator PR1 at this time.

Compared with the prior art, the communication system based on DOCSIS protocol provided by the embodiment of the present disclosure sends signals through the server and demodulates the received signals; signals sent and received by the server is transmitted through the coaxial cable; Then, the signal sent by the server is divided into downstream signal and full duplex signal by the frequency divider; further, the downstream signal sent by the server is transmitted to the first modulation and demodulation unit through the downstream communication path, the upstream communication path transmits the upstream signal sent by the second modulation and demodulation unit to the server, and the full duplex communication path simultaneously transmits the downstream signal divided by the frequency divider and the upstream signal sent by the second modulation and demodulation unit, separates the downstream signal from the full duplex signal and transmit to the first modulation and demodulation unit, and transmits the upstream signal sent by the second modulation and demodulation unit to the server, so as to realize upstream and downstream in band multiplexing and improve the upstream and downstream transmission speed.

Many details are often found in the art such as the other features of a mobile terminal. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A communication system based on Data Over Cable Service Interface Specification (DOCSIS) protocol, the communication system comprising:
   a server configured to send a signal and demodulate a received signal;
   a coaxial cable configured to transmit signals sent and received by the server through a coaxial cable network;
   a frequency divider connected to the coaxial cable, and configured to divide the signal sent by the server into a downstream signal and a full duplex signal;
   a downstream communication path configured to transmit the downstream signal sent by the server to a first modulation and demodulation unit;
   an upstream communication path configured to transmit an upstream signal sent by a second modulation and demodulation unit to the server; and
   a full duplex communication path configured to simultaneously transmit the downstream signal divided by the frequency divider and the upstream signal sent by the second modulation and demodulation unit, separate the downstream signal from the full duplex signal and transmit to the first modulation and demodulation unit, and transmit the upstream signal sent by the second modulation and demodulation unit to the server;
   wherein a bandwidth range of the full duplex communication path is 108 Mega Hertz (MHz)~684 MHz, and the full duplex communication path comprises a primary filter path, a secondary filter path and a tertiary filter path:
   the primary filtering path comprises:
   a second low-pass filter electrically connected to the frequency divider, and configured for passing downstream signals with a bandwidth of 108 MHz~684 MHz;
   a first synthesizer, a first input end of the first synthesizer being electrically connected to an output of the second low-pass filter, the first synthesizer being configured for removing the upstream signal in the full duplex signal leading to the first modulation and demodulation unit;
   a first Radio Frequency (RF) switch, a common end of the first RF switch being electrically connected to an output end of the first synthesizer, a first end of the first RF switch being electrically connected to the first modulation and demodulation unit, the first RF switch being configured for transmitting the downstream signal with the bandwidth of 108 MHz~684 MHz to the first modulation and demodulation unit;
   a first phase regulator, an input end of the first phase regulator being electrically connected to the second modulation and demodulation unit, the first phase regulator being configured for phase adjustment of the upstream signal sent by the second modulation and demodulation unit;
   a second power amplifier, an input end of the second power amplifier being electrically connected to an output end of the first phase regulator, an output end of the second power amplifier being electrically connected to a second input end of the first synthesizer, the second power amplified being configured for adjusting a power of the phase adjusted signal and outputting a signal with an opposite phase and a same power as the upstream signal sent by the second modulation and demodulation unit;
   a system-on-a-chip electrically connected to the second power amplifier, and configured for controlling a magnification of the second power amplifier.

2. The communication system based on DOCSIS protocol according to claim 1, wherein a bandwidth range of the downstream communication path is 684 Mega Hertz (MHz) ~1812 MHz, and the downstream communication path comprises:
   a first high pass filter electrically connected between the frequency divider and the first modulation and demodulation unit to pass a high-frequency downstream signal with the bandwidth of 684 MHz~1812 MHz.

3. The communication system based on DOCSIS protocol according to claim 1, wherein a bandwidth range of the upstream communication path is 5 MHz~85 MHz, and the upstream communication path comprises:

a first power amplifier electrically connected to the second modulation and demodulation unit, and configured for adjusting a power of the upstream signal sent by the second modulation and demodulation unit;

a system-on-a-chip electrically connected to the first power amplifier, and configured for controlling a magnification of the first power amplifier;

a first low-pass filter electrically connected between the first power amplifier and the frequency divider, and configured for passing a low-frequency upstream signal with a bandwidth of 5 MHz~85 MHz.

4. The communication system based on DOCSIS protocol according to claim 1, wherein the secondary filtering path comprises:

the second low-pass filter, the input end of the second low-pass filter being electrically connected to the frequency divider, the second low-pass filter being configured for passing the downstream signal with a bandwidth of 108 MHz~684 MHz;

the first synthesizer, the first input of the first synthesizer being electrically connected to the output of the second low-pass filter;

the first RF switch, the common end of the first RF switch being electrically connected to the output end of the first synthesizer;

a third low-pass filter, an input end of the third low-pass filter being electrically connected to a second end of the first RF switch, the third low-pass filter being configured for passing the downstream signal with a bandwidth of 108 MHz~492 MHz;

a second synthesizer, a first input end of the second synthesizer being electrically connected to an output of the third low-pass filter;

a second RF switch, a common end of the second RF switch being electrically connected to an output end of the second synthesizer, a first end of the second RF switch being electrically connected to the first modulation and demodulation unit, the second RF switch being configured for transmitting the downstream signal with the bandwidth of 108 MHz~492 MHz to the first modulation and demodulation unit;

a second phase regulator, an input end of the second phase regulator being electrically connected to the second modulation and demodulation unit, the second phase regular being configured for phase adjustment of the upstream signal sent by the second modulation and demodulation unit;

a third power amplifier, an input end of the third power amplifier being electrically connected to an output end of the second phase regulator, an output end of the third power amplifier being electrically connected to a second input end of the second synthesizer, the third power amplifier being configured for adjusting a power of the phase adjusted signal and output a signal with an opposite phase and a same power as the upstream signal sent by the second modulation and demodulation unit;

the system-on-a-chip, electrically connected to the third power amplifier, and configured for controlling a magnification of the third power amplifier.

5. The communication system based on DOCSIS protocol according to claim 4, wherein the tertiary filter path comprises:

the second low-pass filter, the input end of the second low-pass filter being electrically connected to the frequency divider, and configured for passing the downstream signal with a bandwidth of 108 MHz~684 MHz;

the first synthesizer, the first input of the first synthesizer being electrically connected to the output end of the second low-pass filter;

the first RF switch, the common end of the first RF switch being electrically connected to the output end of the first synthesizer;

the third low-pass filter, the input end of the third low-pass filter being electrically connected to the second end of the first RF switch, the third low-pass filter being configured for passing the downstream signal with a bandwidth of 108 MHz~492 MHz;

the second synthesizer, the first input end of the second synthesizer being electrically connected to the output end of the third low-pass filter;

the second RF switch, the common end of the second RF switch being electrically connected to the output end of the second synthesizer;

a fourth low-pass filter, an input end of the fourth low-pass filter being electrically connected to a second end of the second RF switch;

a third synthesizer, a first input end of the third synthesizer being electrically connected to an output end of the fourth low-pass filter, an output of the third synthesizer being electrically connected to the first modulation and demodulation unit, the third synthesizer being configure for transmitting the downstream signal with the bandwidth of 108 MHz~300 MHz to the first modulation and demodulation unit;

a third phase regulator, an input end of the third phase regulator being electrically connected to the second modulation and demodulation unit, the third phase regulator being configured for phase adjustment of the upstream signal sent by the second modulation and demodulation unit;

a fourth power amplifier, an input end of the fourth power amplifier being electrically connected to an output end of the third phase regulator, and the output end of the fourth power amplifier being electrically connected to the second input end of the third synthesizer, the fourth power amplifier being configured for adjusting a power of the phase adjusted signal and output a signal with an opposite phase and a same power as the upstream signal sent by the second modulation and demodulation unit;

the system-on-a-chip, electrically connected to the fourth power amplifier, and configured for controlling a magnification of the fourth power amplifier.

6. The communication system based on DOCSIS protocol according to claim 5, wherein the second modulation and demodulation unit is further electrically connected to a common end of the frequency divider and the second low-pass filter to form an upstream sub communication path to transmit the upstream signal sent by the second modulation and demodulation unit to the server.

7. The communication system based on DOCSIS protocol according to claim 6, wherein when the communication protocol is DOCSIS4.0:

when the bandwidth range of the downstream signal is a first bandwidth range ranging from 108 MHz to 300 MHz, the common end of the first RF switch is connected to the second end of the first RF switch, and the common end of the second RF switch is connected to the second end of the second RF switch;

when the bandwidth range of the downstream signal is a second bandwidth range ranging from 300 MHz to 492 MHz, the common end of the first RF switch is connected to the second end of the first RF switch, and the common end of the second RF switch is connected to the first end of the second RF switch;

when the bandwidth range of the downstream signal is a third bandwidth range ranging from 492 MHz to 684 MHz, the common end of the first RF switch is connected to the first end.

8. The communication system based on DOCSIS protocol according to claim 6, when the communication protocol is DOCSIS3.1/3.0/2.0:

the common end of the first RF switch is connected to the first end of the first RF switch, and the second power amplifier, the third power amplifier and the fourth power amplifier have no signal output.

9. The communication system based on DOCSIS protocol according to claim 6, wherein:

the second modulation and demodulation unit is further configured to send out calibration signals with a first bandwidth range, a second bandwidth range and a third bandwidth range;

when the second modulation and demodulation unit sends out the calibration signal with the first bandwidth range, the calibration signal reaches the first modulation and demodulation unit through the upstream sub communication path and the tertiary filter path, and the system-on-a-chip adjusts the fourth power amplifier and the third phase regulator to cause a power of the calibration signal with the first bandwidth range obtained by the first modulation and demodulation unit to become 0 Decimal Bel Millivolt (dbmv);

when the second modulation and demodulation unit sends out the calibration signal with the second bandwidth range, the calibration signal reaches the first modulation and demodulation unit through the upstream sub communication path and the secondary filter path, and the system-on-a-chip adjusts the third power amplifier and the second phase regulator to cause the power obtained by the calibration signal of the second bandwidth range in the first modulation and demodulation unit to become 0 dbmv;

when the second modulation and demodulation unit sends out the calibration signal with the third bandwidth range, the calibration signal reaches the first modulation and demodulation unit through the upstream sub communication path and the primary filter path, and the system-on-a-chip adjusts the second power amplifier and the first phase regulator to cause the power obtained by the calibration signal of the third bandwidth range in the first modulation and demodulation unit to become 0 dbmv.

\* \* \* \* \*